FREQUENCY MULTIPLIER CIRCUIT

Filed May 4, 1953

*INVENTOR,*
ALWIN HAHNEL
*BY*
Harry M. Saragovitz
Attorney 2,730,624

FREQUENCY MULTIPLIER CIRCUIT

Alwin Hahnel, Little Silver, N. J., assignor to the United States of America as represented by the Secretary of the Army Application May 4, 1953, Serial No. 353,029

9 Claims. (Cl. 250—36)

(Granted under Title 35, U. S. Code (1952), sec. 266)

The invention described herein may be manufactured and used by or for the Government for governmental purposes, without the payment of any royalty thereon.

This invention relates to a frequency multiplier and more particularly to a frequency multiplier where a high degree of multiplication is desired at a prescribed frequency.

The usual procedure in frequency multiplication by means of electron discharge devices comprising several electrodes consists in designing the electron discharge device as an amplifier and in tuning its output to a frequency NF which is a harmonic of the exictation frequency F. These different harmonics vary very greatly in amplitude, being generally of much greater amplitude at the lower harmonic frequencies than at the higher harmonic frequencies. Hence the multiplication systems used heretofore required a large number of stages to provide any extended factor of multiplication. In such systems a high degree of frequency accuracy is difficult to obtain if a multiplicity of frequency channels is required under conditions which do not allow use of a separate crystal for each one. Moreover, the isolation of the desired harmonic frequencies from the many spurious oscillations and unwanted harmonics becomes very complicated and is difficult to achieve.

It is therefore an object of the present invention to provide a frequency multiplying system in which the selection of any high order multiplication factor is readily and simply accomplished with a minimum of adjustment and control devices.

It is another object of the present invention to provide a frequency multiplying system utilizing one tuned circuit wherein the amplitude of the desired harmonic frequency is very much greater than the spurious oscillations or unwanted harmonics.

It is yet another object of the present invention to provide a frequency multiplying system which permits better control of the amplitude of the desired output harmonic frequency.

It is still a further object of the present invention to provide a frequency multiplying system wherein the amplitude of the desired harmonic frequency is at a maximum.

In accordance with the present invention there is provided a frequency multiplier circuit including a source of fundamental frequency voltage and a pulse shaper responsive to the fundamental frequency voltage and adapted to produce gating pulses having a repetition frequency equal to the fundamental frequency. Each cycle of the gating pulse comprises a positive portion of relatively long duration and a negative portion of relatively short duration. Also included is an electron discharge device, normally non-conductive, having an input circuit and an output circuit which includes means for selecting any desired harmonic frequency of the fundamental frequency. Means are also provided for coupling the gating pulses to the input circuit of the electron discharge device whereby said electron discharge device is rendered conductive and shock-excited into oscillations at the selected harmonic frequency for the duration of the positive portion of the gating pulses, and is rendered non-conductive for the duration of the negative portion of the gating pulses. Also included are regenerative means coupled from the output circuit of the electron discharge device to the input circuit thereof for rapidly increasing the amplitude of the oscillatory energy at the selected harmonic frequency to saturation level when the electron discharge device is conducting, and means in circuit with the frequency selecting means and responsive to the gating pulses for rapidly damping the oscillatory energy when the electron discharge device is rendered non-conductive.

For a better understanding of the invention together with other and further objects thereof, reference is had to the following description taken in connection with the accompanying drawing in which.

Figure 1:
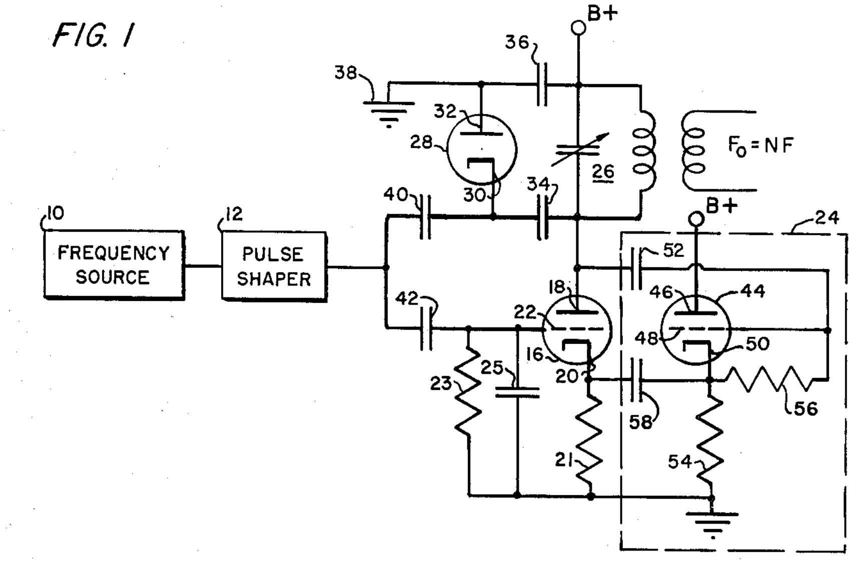
Fig. 1 is a schematic representation of my invention.
Figure 2:
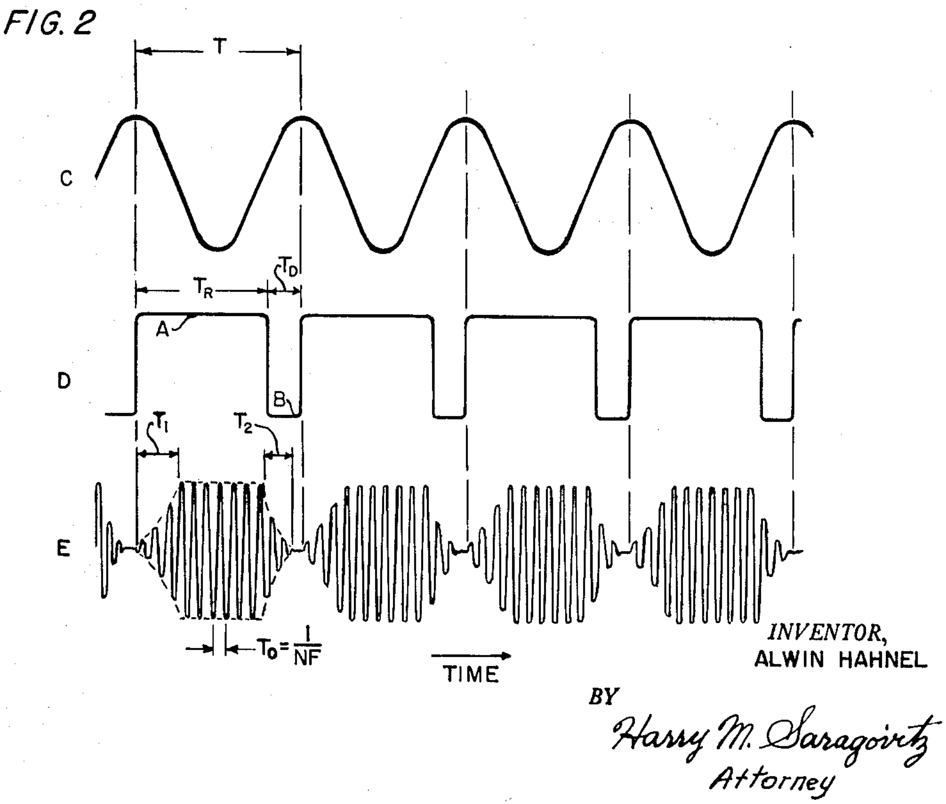
Fig. 2 illustrates curves explaining the theory of operation of my invention.

Referring now to Figs. 1 and 2 of the drawing, there is shown at 10 a source of frequency voltage F which may comprise any suitable oscillator designed to produce a stable frequency output illustrated in Fig. 2C. The output of frequency source 10 is applied to pulse shaper 12 for producing a substantially square-shaped voltage wave illustrated in Fig. 2D, having a repetition frequency equal to F. Since such oscillators and pulse shapers are well known in the art, no further description thereof is believed necessary. Each cycle of the square wave output from pulse shaper 12 comprises a positive portion A of relatively long duration and a negative portion B of relatively narrow duration, hereinafter referred to respectively as the regenerative period and the degenerative period. Thus the pulse repetition period T may be considered as being divided into a regenerative period $T_R$ and a degenerative period $T_D$ (Fig. 2D). It has been experimentally determined that for maximum effectiveness, the duration of regenerative period $T_R$ should be at least 90° of the duration of pulse repetition period T.

The square-wave output of pulse shaper 12 controls the duration of the period of oscillation of a harmonic frequency generator comprising an electron discharge device 16 having an anode 18, a cathode 20, a control grid 22, and a regenerative feedback circuit 24 coupled between anode 18 and cathode 20. Cathode 20 is connected to ground through resistor 21 and control grid 22 is connected to ground through resistor 23 which is in parallel arrangement with capacitor 25. The values of resistor 23 and capacitor 25 are so chosen that electron discharge device 16 is normally non-conductive. The anode 18 is connected to a tuned circuit 26 which is tuned to the desired harmonic frequency NF. The high voltage anode supply is indicated by the conventional B+ symbol and may be from any suitable source. A diode 28 having a cathode 30 and an anode 32 is connected across tuned circuit 26 through respective direct current blocking capacitors 34 and 36, capacitor 34 being connected between diode cathode 30 and one terminal of tuned circuit 26 and capacitor 36 being connected between diode anode 32 and the other terminal of tuned circuit 26. Anode 32 of diode 28 is grounded as at 38. The square-wave output voltage from pulse shaper 12 is simultaneously applied to diode cathode 30 and control grid 22 of electron discharge device 16 through coupling capacitors 40 and 42 respectively. By this arrangement, diode 28 and electron discharge device 16 will be synchronously controlled so that when discharge device 16 is shocked into oscillation and rendered conductive, diode 28 will remain non-conductive; and when discharge device 16 is rendered non-conductive, diode 28 will be rendered conductive to provide a damping circuit for the quenched oscillations.

A regenerative feedback circuit 24 is connected between anode 18 and cathode 20 of harmonic generator 16 to provide a relatively short build-up period for the shock excited oscillations. As shown, the regenerative circuit comprises a cathode follower 44 having a plate 46, a control grid 48 and a cathode 50. The oscillatory energy from tuned circuit 26 is coupled to cathode follower grid 48 through capacitor 52. Cathode 50 is connected to ground through resistor 54; grid 48 is connected to cathode 50 through resistor 56, and plate 46 is connected directly to B+. The output of cathode 50 is coupled to cathode 20 through capacitor 58. It is to be understood, of course, that any other suitable regenerative feedback circuit well known in the art may be substituted for the cathode follower type regenerative circuit described above.

To better explain the operation of the frequency multiplier, reference is made to the wave forms shown in Fig. 2. Curve C represents the stable frequency output voltage F of source 10; curve D represents the output of pulse shaper 12; and curve E shows the output of the harmonic frequency generator at the desired harmonic frequency NF. As shown, the period T for the square waves illustrated in curve B is the same as the period of the sinusoidal output wave form source 10. As mentioned hereinabove, discharge device 16 is normally non-conductive and the output from pulse shaper 12 (curve D) is applied simultaneously to diode anode 30 and to control grid 22. Thus, for the regenerative period $T_R$ diode 28 is rendered non-conductive inasmuch as cathode 30 is now more positive than anode 32. However, discharge device 16 is shock-excited into oscillation, and, if there is a sufficiently high ratio of the time of pulse duration $T_R$ to the time of one period $$T_0=\frac{1}{NF}$$

of the desired harmonic frequency, the amplitude of the oscillations at the desired harmonic frequency will increase during the regenerative period until a non-linear range of the tube characteristic of discharge device 16 becomes involved and a constant amplitude condition is reached. This is clearly shown in curve E of Fig. 2 where the amplitude of the oscillation has reached a constant amplitude after a build-up time $T_1$. To obtain a spectrum of minimum envelope bandwidth, it is necessary to extend the constant amplitude to a practical limit. This requires build-up and decay periods which are short compared to the intervals between successive pulses. The build-up period $T_1$ can be shortened by increasing the regenerative coupling from cathode 50 to cathode 20. To insure a rapid decay period, $T_2$, tuned circuit 26 is shunted, insofar as the harmonic frequencies are concerned, by diode 28 which is rendered conductive for only the degenerative period $T_D$ while discharge device 16 is cut off. This combination will permit rapid decay of the desired harmonic frequency since diode 28 acts as a damping circuit across tuned circuit 26. This damping circuit is deactivated immediately at the beginning of the next regenerative period, thus further reducing the build-up period to a very few cycles of the desired harmonic frequency. The phase of the oscillator wave-trains must be synchronized by the applied pulses from pulse shaper 12 in order to produce an output spectrum that consists only of components at integral multiples N of the input pulse repetition frequency F. Thus, the initial phase of the oscillations is controlled in the same manner by the leading edge of the injected pulses at the termination of each degenerative period. Due to the rapid decay period, the amplitude of oscillation is smaller than the amplitude obtained due to the shock excitation of tuned circuit 26 at the beginning of each regenerative period. It has been found that the bandwidth of the spectrum envelope can be kept so narrow that the amplitude of any single desired frequency of the very large number of available ones is emphasized up to 40 db over the amplitude of the adjacent harmonics.

While there has been described what is at present considered to be the prefererd embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A frequency multiplier circuit comprising a source of fundamental frequency voltage, means responsive to the output of said source for generating gating pulses having a repetition frequency equal to said fundamental frequency, each cycle of said gating pulse comprising a positive portion of relatively long duration and a negative portion of relatively short duration, an electron discharge device having an input circuit and an output circuit, said output circuit including means for selecting any desired harmonic frequency of said fundamental frequency, said electron discharge device being normally non-conductive, means for coupling said gating pulses to said input circuit whereby said electron discharge device is rendered conductive and shock-excited into oscillation at said harmonic frequency for the duration of said positive portion and rendered non-conductive for the duration of said negative portion, regenerative means coupled from said output circuit and said input circuit for rapidly increasing the amplitude of the oscillatory energy at said harmonic frequency to saturation level when said electron discharge device is conducting, and unidirectional discharge means in circuit with said frequency selecting means and responsive to said gating pulses for damping said oscillatory energy only when said electron discharge device is rendered non-conductive.

2. The frequency multiplier circuit in accordance with claim 1 wherein said last mentioned means comprises a diode, a first capacitor connected between one terminal of said frequency selecting means and the cathode of said diode, a second capacitor connected between the other terminal of said frequency selecting means and the anode of said diode, and means for coupling said gating pulses to said cathode, said anode being grounded.

3. A frequency multiplier circuit comprising a source of fundamental frequency voltage, means responsive to the output of said source for generating gating pulses having a repetition frequency equal to said fundamental frequency, each cycle of said gating pulse comprising a positive portion of relatively long duration and a negative portion of relatively short duration, an electron discharge device having at least a grid, a cathode, and a plate, said electron discharge device being normally non-conductive, means in circuit with said plate for selecting any desired harmonic frequency of said fundamental frequency, a diode having its respective electrodes capacitively coupled across said harmonic frequency selecting means, means for simultaneously coupling said gating pulses to said grid and said diode whereby said diode is rendered non-conductive and said electron discharge device is rendered conductive and shock-excited into oscillation for the duration of the positive portions of said gating pulses, and said diode is rendered conductive and said electron discharge device is rendered non-conductive for the duration of the negative portion of said gating pulses, and regenerative means connected between said plate and said cathode for rapidly increasing the amplitude of the oscillatory energy at said harmonic frequency to saturation level when said electron discharge device is conducting, said diode rapidly damping said oscillatory energy to substantially noise level when said diode is rendered conductive.

4. The frequency multiplier circuit in accordance with claim 3 wherein the duration of the positive portion of said gating pulse is at least 90% of the pulse repetition period of said gating pulses.

5. A frequency multiplier circuit comprising a source of radio-frequency energy having a predetermined fundamental frequency, means responsive to the output of said source for generating substantially square-wave voltage pulses having a repetition frequency equal to said fundamental frequency, each cycle of said square-wave pulses comprising a positive portion of relatively long duration and a negative portion of relatively narrow duration, an electron discharge device having at least a plate, a control grid and a cathode, said electron discharge device being normally non-conductive, a resonant circuit connected to said plate and tuned to a predetermined harmonic frequency of said fundamental frequency, a diode having its cathode capacitively coupled to one terminal of said tuned circuit, the anode of said diode being capacitively coupled to the other terminal of said tuned circuit, means for simultaneously coupling said square-wave voltage pulses to said diode cathode and said control grid whereby said discharge device is rendered conductive and shock-excited into oscillation at said harmonic frequency when said diode is rendered non-conductive for the duration of said positive portions, and said discharge device is rendered non-conductive when said diode is rendered conductive for the duration of said negative portion, and regenerative means connected between the plate and cathode of said electron discharge device.

6. The frequency multiplier circuit in accordance with claim 5 wherein said regenerative means comprises a cathode follower having an input circuit and an output circuit, said input circuit being coupled to the plate of said electron discharge device and said output circuit being coupled to the cathode of said electron discharge device.

7. A frequency multiplier circuit comprising a source of gating pulses having a predetermined repetition frequency, each cycle of said gating pulses comprising a positive portion of relatively long duration and a negative portion of relatively short duration, a first electron discharge device normally non-conductive and having an input circuit and an output circuit, said output circuit including means for selecting a prescribed harmonic frequency of said repetition frequency, means for coupling said gating pulses to said input circuit whereby said electron discharge device is rendered conductive and shock excited into oscillations at said harmonic frequency for the duration of said positive portion, and rendered non-conductive for the duration of said negative portion, regenerative means coupled from said output circuit to said input circuit for rapidly increasing the amplitude of the oscillatory energy at said harmonic frequency to saturation level when said discharge device is conducting, and a second normally non-conductive electron discharge means connected in circuit with said frequency selecting means and responsive to said gating pulses for rapidly damping said oscillatory energy only when said first electron discharge device is rendered non-conductive.

8. A frequency multiplier circuit comprising a source of gating pulses having a predetermined repetition frequency, each cycle of said gating pulses comprising a positive portion of relatively long duration and a negative portion of relatively short duration, an electron discharge device normally non-conductive and having an input circuit and an output circuit, said output circuit including means for selecting a prescribed harmonic frequency of said repetition frequency, a unidirectional discharge device connected across said frequency selecting means, means for simultaneously coupling said gating pulses to said input circuit and said unidirectional discharge device whereby said unidirectional discharge device is rendered non-conductive and said electron discharge device is rendered conductive and shock excited into oscillation for the duration of the positive portions of said gating pulses, and said unidirectional discharge device is rendered conductive and said electron discharge device is rendered non-conductive for the duration of the negative portion of said gating pulses, regenerative means coupled between said input and output circuits for rapidly increasing the amplitude of the oscillatory energy at said harmonic frequency to saturation level when said electron discharge device is conducting, said unidirectional discharge device damping said oscillatory energy to substantially noise level when said electron discharge device is non-conducting.

9. The frequency multiplier circuit in accordance with claim 8 wherein the ratio of the duration of said positive portion to the duration of the period of said harmonic frequency is a relatively high value.

References Cited in the file of this patent

UNITED STATES PATENTS 2,495,704 De Rosa -------------- Jan. 31, 1950